Nov. 24, 1970  J. W. MAUSTELLER  3,542,522
GAS GENERATING DEVICE USING AN OXYGEN PRODUCING CANDLE
Filed Jan. 8, 1968  2 Sheets-Sheet 1

INVENTOR
JOHN W. MAUSTELLER

BY *Brown, Critchlow, Flick & Peckham*
ATTORNEYS.

INVENTOR
JOHN W. MAUSTELLER

United States Patent Office

3,542,522
Patented Nov. 24, 1970

3,542,522
GAS GENERATING DEVICE USING AN OXYGEN PRODUCING CANDLE
John W. Mausteller, Evans City, Pa., assignor to Mine Safety Appliances Company, Pittsburgh, Pa., a corporation of Pennsylvania
Filed Jan. 8, 1968, Ser. No. 696,346
Int. Cl. B01j 7/00; C01b 13/08
U.S. Cl. 23—281  3 Claims

ABSTRACT OF THE DISCLOSURE

An oxygen generating device comprising a closed container having an oxygen outlet at one end and an oxygen producing candle disposed within the container and in tight engagement with the sidewall thereof. Preferably, the candle has an axial passage therethrough in communication with said outlet at one end of the passage with a means for igniting the candle disposed at the opposite end of the passage. The passage is filled with a filter material, whereby said filter will be exposed progressively to the oxygen produced by the candle as it burns away.

---

It is among the objects of this invention to provide a gas generating device, in which an oxygen producing candle carries its own filter that presents a fresh filter area to the oxygen being produced as the candle is consumed.

The oxygen from chlorate candles contains finely divided sodium chloride, which must be filtered. It is customary to do the filtering at the gas outlet of the container for the candle. In the case of containers designed for replacement of candles, the filter generally is replaced when a new candle is inserted. Even if candle replacement is not contemplated, it is necessary to provide sufficient filter area to prevent the filter from becoming clogged with smoke particles. Since the length of a candle generally is several times greater than its diameter, a rather large filter usually is required to provide sufficient surface area to prevent clogging.

The invention is illustrated in the accompanying drawings, in which

Figure 1:
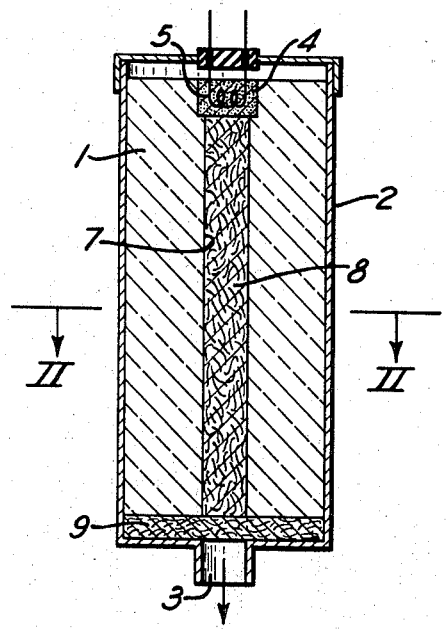
FIG. 1 is a central vertical section through a gas generating device.
Figure 2:
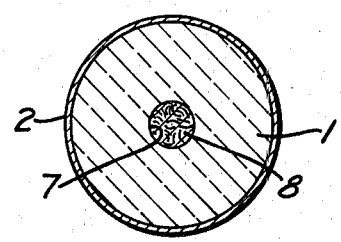
FIG. 2 is a cross section taken on the line II—II of FIG. 1.

Referring to the drawings, a chlorate candle 1 is enclosed in a metal container 2, which has a central outlet 3 in one end, usually its bottom, for oxygen produced by the candle when it burns. The opposite end of the candle is spaced from the adjacent end of the container and contains an ignition cone 4 in its center which may be ignited by means of an electrical match or a hot wire 5 extending out of the adjoining end of the container. As the cone burns down into the candle it ignites the surrounding portion of the latter. The candle fits tightly in the container to prevent smoke from passing between the outside of the candle and the container on its way to the outlet. A tight fit can be obtained either by pushing a candle of the right size into the container or by casting it in the container directly. The latter method is less expensive because the container serves as a mold for the candle. Likewise, candles that are produced by pressing can be pressed directly into the container.

In accordance with this invention, the candle is provided with an axial passage 7 through it, one end of which is plugged by the ignition cone. The rest of the passage is filled with filtering means 8, such as quartz fiber, ceramic fibers or other inert fibers that will not melt at the candle temperature and that will remove sodium chloride and other impurities from the oxygen produced. The axial passage and the filtering material therein are in line with the outlet of the container. If desired, a mat 9 of filtering material may be placed between the outlet and the adjacent end of the candle to make sure that no smoke escapes while the last bit of candle is being consumed. Or, for the same reason, the filtering material can project from the candle and extend a short distance into the container outlet as shown in FIG. 3.

Figure 3:
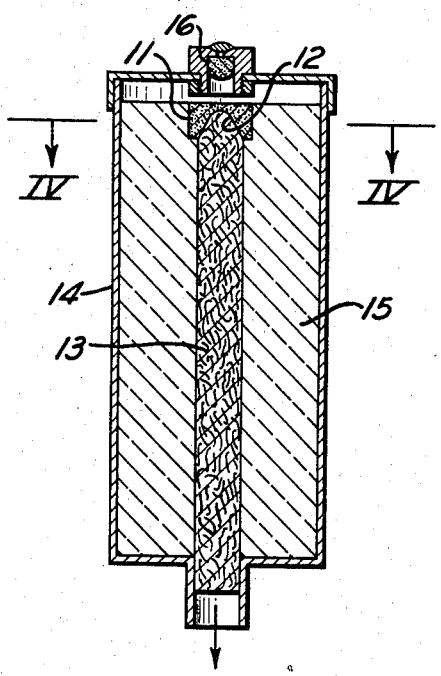
FIG. 3 is a fragmentary central vertical section of a modification.
Figure 4:
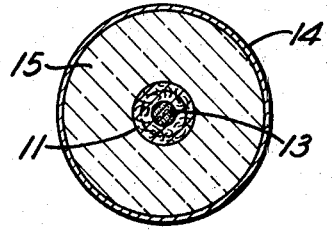
FIG. 4 is a cross section taken on the line IV—IV of FIG. 3.

Modified ignition means also are shown in FIG. 3, where the ignition cone 11 is provided with a recess 12, into which the central core of filtering material 13 extends. Since the center of the core burns through quickly and exposes the upper end of the filter, this shape of cone provides immediate access of the evolved gas to the upper end of the filter without overpressurizing the container 14 above the candle 15. One way of igniting the cone is by means of a primer 16 mounted in the top of the container.

It will be seen that as any of these candles burns, fresh filtering material continues to be exposed to the oxygen being produced. The gas will flow lengthwise through the filtering material to the outlet of the container. An advantage is that a minimum amount of candle material is replaced by the filter, because the filter is inside the candle instead of around its outside. This is a special advantage where the volume or diameter of the container is required to be held to a minimum. Also, there is no separate filter to handle because it is a unitary part of the candle. A fresh filter goes into the container with the candle every time a new candle is inserted.

Figure 5:
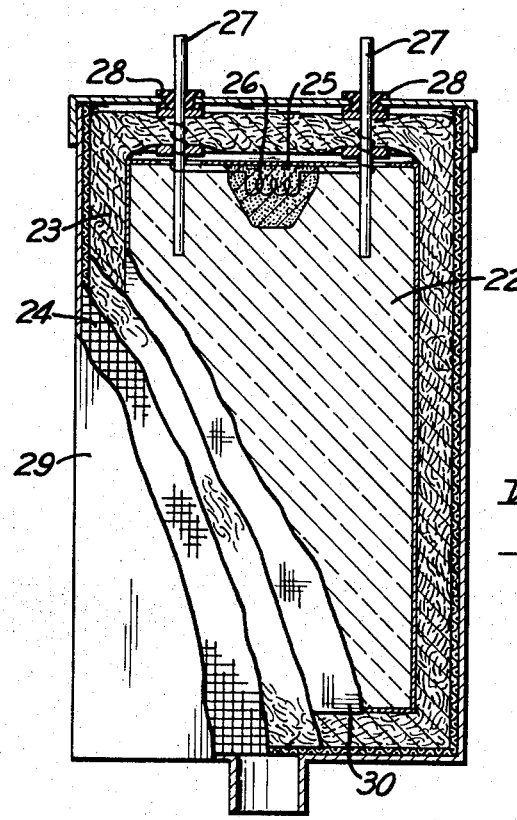
FIG. 5 is a combination elevation and vertical section of another modification.

In the next embodiment of the invention shown in FIG. 5, the advantage of an internal filter is lacking, but there still is the advantage of a filter carried by the candle itself and progressively exposing a fresh area to the gas being generated as the candle burns. Thus, the candle 22 is wrapped completely in a layer 23 of suitable filtering material, such as quartz fiber, and overwrapped with metal screening 24. Since the entire candle is completely enclosed in the filtering material, the oxygen produced by it must always pass through the filter, which presents a fresh side surface as the candle burns from one end to the other. The ignition cone 25 can be ignited by a hot wire 26 connected into an electric circuit through metal prongs 27 embedded in the candle and extending out through the filtering means. The outer ends of the prongs extend out through sealing plugs 28 in the top of the container 29, where they can be connected in an electric circuit. If the filter is made from glass fibers, which have a lower melting point than quartz fibers, it is necessary to first wrap the candle in a layer 30 of perforated metal to keep the filter from engaging the candle directly.

Figure 6:
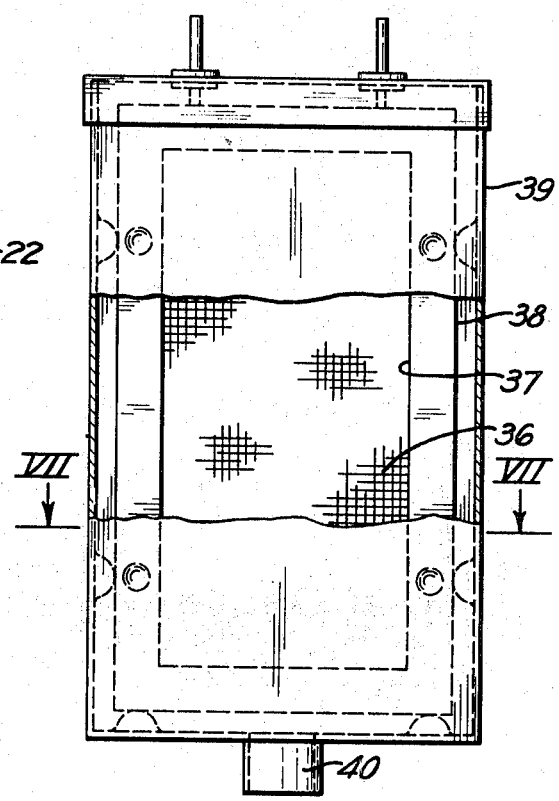
FIG. 6 is an elevation, partly broken away, of still another embodiment.
Figure 7:
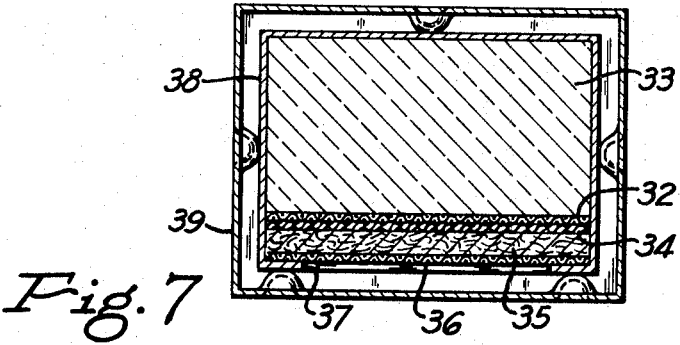
FIG. 7 is a cross section taken on the line VII—VII of FIG. 6.

In still another form of the invention, shown in FIGS. 6 and 7, the filtering means is applied to only one side of a candle, while the rest of it is covered by a metal case. This technique increases the handling capabilities of the candle and assists in preventing damage to the filter. Although various filtering means may be used, that shown in FIG. 7 includes a brass screen 32 next to the candle 33, and then glass fiber cloth 34, a compressed glass fiber mat 35 and another metal screen 36. These are held against one side of the candle by the overlapping edges of the window 37 formed in a metal case 38 in which the candle fits snugly. As the candle burns from one end to the other, substantially all of the oxygen produced by it passes laterally through the filtering material, a new area of which is continuously being exposed to the gas. Of course, the candle and its case are housed in a container 39 provided with an outlet 40 for the gas after it has passed through the filter.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A gas generating device comprising a closed container having an outlet at one end, an oxygen producing candle inside the container in tight engagement with its side wall and provided with an axial passage having one end in communication with said outlet, a filter filling said passage, and readily ignitable means at the opposite end of the candle for igniting the candle, whereby said filter will be exposed progressively to the oxygen produced by the candle as it burns away, and the oxygen will flow through the filter and said passage and out of said container outlet.

2. A gas generating device according to claim 1, in which the filter projects from the candle into the outlet.

3. A gas generating device according to claim 1, in which said ignitable means is a solid member disposed in said opposite end of said passage and is provided with a recess in its inner end, and said filter extends into said recess.

References Cited

UNITED STATES PATENTS

| | | | |
|---|---|---|---|
| 2,114,142 | 4/1938 | Hloch | 23—281 |
| 2,558,756 | 7/1951 | Jackson et al. | 23—281 |
| 2,764,475 | 9/1956 | Bovard et al. | 23—281 |
| 3,117,424 | 1/1964 | Hebenstreit | 23—281 XR |
| 3,163,014 | 12/1964 | Wismar | 23—281 XR |
| 3,276,846 | 10/1966 | Moni et al. | 23—281 |

FOREIGN PATENTS 451,170  7/1936  Great Britain.

MORRIS O. WOLK, Primary Examiner

B. S. RICHMAN, Assistant Examiner

U.S. Cl. X.R.

23—221